Patented Dec. 19, 1944

2,365,455

UNITED STATES PATENT OFFICE 2,365,455

ARTICLE OF MANUFACTURE AND PROCESS OF PRODUCING THE SAME

Ralph T. K. Cornwell, Fredericksburg, Va., assignor to Sylvania Industrial Corporation, Fredericksburg, Va., a corporation of Virginia No Drawing. Application January 19, 1942, Serial No. 427,389

6 Claims. (Cl. 106—197)

The present invention relates to alkali-soluble cellulosic materials. More particularly, it relates to the treatment of regenerated cellulose to render it soluble in aqueous solutions of alkalis, to alkaline solutions of cellulose so formed and to articles made therewith.

Many needs exist for coagulable, alkali-soluble cellulosic materials. For example, these materials find many uses in the treatment of textiles, as thickeners for various compositions such as inks and for sizing paper and the like. For the purpose of rendering cellulose soluble, it has been degraded heretofore with acids and also with alkalis. It has been impossible, however, to accurately control the degradation procedures, with the result that the degraded cellulose compositions have been lacking in uniformity in regard to viscosity, solubility, and color, and hand or feel after application of the compositions to textiles or the like. This has created considerable difficulty because uniform application treatments involving such materials have been substantially impossible which has increased the expense of using such materials because of the high degree of waste inevitably resulting from the use of such non-uniform products.

It is an object of the present invention to provide a process of treating regenerated cellulosic material to produce an alkali-soluble composition which is capable of overcoming all of the foregoing difficulties.

It is another object of the present invention to provide a process of treating regenerated cellulosic material to render it soluble in alkaline solutions.

It is a further object of the present invention to provide a process of treating regenerated cellulose to produce alkaline solutions of cellulose having controlled viscosity and controlled cellulose concentration.

It is a still further object of the present invention to provide an alkaline solution of cellulosic material which can be faithfully reproduced each time and thereby employed in uniform application treatments repeatedly.

Other objects and advantages, if not particularly pointed out, will be apparent to those skilled in the art from the following detailed description of what are now considered the preferred embodiments of the invention.

The process of the invention in general comprises treating a regenerated cellulosic material with an oxidizing agent or an acid to degrade the material in controlled manner to produce a cellulosic material which is soluble in aqueous solutions of alkalis.

The composition of the invention in general comprises a degraded cellulosic material made from regenerated cellulose as a starting material and which has substantially uniform physical properties, such as viscosity, solubility in alkaline solutions, coloration, film-forming capacity, ability to adhere to textile materials, and to withstand washing with soap and water under normal laundering conditions.

The invention accordingly comprises the several steps and the relation of one or more of such steps with respect to each of the others, and the product possessing the features, properties, and the relation of constituents, which are exemplified in the following detailed disclosure, and the scope of the invention will be indicated in the claims.

The starting material for producing the composition of the present invention may comprise any undegraded or partially degraded regenerated cellulosic material. For example, the cellulosic starting material may have been regenerated from viscose, cuprammonium solutions of cellulose, solutions of cellulose in zinc chloride and other inorganic solvents as well as quaternary ammonium compounds and other organic solvents, or produced by deesterifying cellulose esters such as denitrating cellulose nitrate or the like.

The regenerated cellulose starting material is preferably in particle form as, for example, having been ground in a shredder or the like, although sheets and films of regenerated cellulosic materials may be employed if desired.

The treating solution for controllably degrading the cellulose may comprise an oxidizing agent such, for example, as sodium hypochlorite, nitric acid, chromic acid, permanganic acid or other acids and their salts. Other acids such as sulphuric acid, phosphoric acid, hydrochloric acid, and the like which are capable of degrading cellulose may also be used.

The regenerated cellulose is treated with the degradation agent preferably by pouring a solution of desired concentration of such agent over the regenerated cellulose and permitting the agent to remain in contact with the cellulose until the desired degradation necessary to produce a cellulosic material having a given solubility in a given concentration of aqueous solution of alkali is produced. The degree of degradation is subject to very accurate control because the homogeneous nature of the regenerated cellulose enables it to be uniformly acted upon by the degrading agent so that all of it is affected alike instead of some of it being affected more than the rest. The controlled degradation is effected by carefully regulating the concentration of the treating agent, the temperature of the treatment and the time of treatment. All of these factors can be readily ascertained empirically for a given regenerated cellulose.

Following the degradation step, the degrading agent is drained from the cellulosic material, which is washed with water until free of the degrading agent and is then permitted to dry either at room temperature or at an elevated temperature. Following this, the degraded cellulose is further divided as by grinding or the like and is then dissolved in desired amount in the selected concentration of alkaline solution to produce a solution of cellulose having a definite viscosity and a definite cellulose concentration. The alkaline solution of cellulose so formed is stable for a considerable length of time, sufficient in all cases to permit the cellulosic solutions to be made up in large batches and used in due course of production regardless of what application of the alkaline solution of cellulosic material is desired. The degradation of the regenerated cellulose and the concentration of the degraded regenerated cellulose in the alkaline solution can be regulated so as to render the alkaline cellulosic solution thixotropic.

As a general thing, the stronger the degrading agent used, the longer the degrading period, and the higher the temperature at which the degradation is carried out, the greater will be the solubility of the resulting regenerated cellulosic hydrate product in weaker concentrations of aqueous alkali solutions and the higher will be the temperatures at which such solutions can be made.

For the purpose of more clearly describing the invention and not in limitation thereof, the following examples of the process for producing the alkali-soluble cellulosic material of the present invention will be given:

Example I

The starting material employed is cellulose hydrate chips obtained as a residue from a reclamation process used to recover glycerine from waste films resulting from the manufacture of Cellophane. The chips may be at atmospheric humidity which means that they will contain from 4 to 5 per cent of moisture and are preferably substantially free from other substances. 600 kilograms of such cellulose chips are placed in an appropriate vessel and covered with an aqueous solution of sodium hypochlorite containing 2.8 grams of chlorine per liter. The regenerated cellulose is permitted to stand in contact with the sodium hypochlorite solution at room temperature with intermittent stirring for a period of 20 to 72 hours. If desired, the sodium hypochlorite solution may be circulated through the regenerated cellulose while suitably maintaining the chlorine content at 2.8 grams per liter.

Thereafter, the degrading agent is drained from the degraded cellulose hydrate in any desired manner, and the regenerated cellulose so treated is washed with cool water until no stains appear on potassium iodide indicator paper placed on the chips and in the filtrate. Thereafter, the degraded regenerated cellulose is suitably dried. The dried chips are then ground into particles of any desired fineness and the material is then ready for dissolution in aqueous solutions of alkali. The degraded regenerated cellulose so treated is soluble in aqueous alkali solutions containing between 4 and 10 per cent caustic such as sodium hydroxide to form solutions containing between 2 and 8 per cent cellulose by weight.

Example II

Same as Example I except that the cellulosic material is not dried following washing but is placed in a closed container until dissolved in the aqueous alkali solution.

Example III 500 kilograms of regenerated cellulose in the form of rayon waste is placed in a suitable container and 1500 liters of a 3 per cent by weight aqueous solution of sulphuric acid is poured over the regenerated cellulose and permitted to stand for 12 to 80 hours at a temperature of 30 to 50° C. The sulphuric acid solution is then drained off and the regenerated cellulose is pressed to remove as much of the sulphuric acid solution as possible. Following this, the regenerated cellulose is washed with cool water until it will no longer turn blue litmus paper red. Thereafter, the degraded regenerated cellulose is suitably dried. The degraded regenerated cellulose so treated is soluble in aqueous alkali solutions containing between 2 and 15 per cent caustic such as sodium hydroxide to form solutions containing between 2 and 15 per cent cellulose by weight.

The alkali-soluble cellulose of the present invention may be used in the form of an alkaline solution to treat various fabrics to improve their feel, appearance and wearing properties, may be used as a filler for paper, or may be mixed with other materials such as water-soluble or alkali-soluble cellulose ethers, viscose, alkali-soluble and water-soluble resins, rubber latex and the like to produce compositions capable of general coating, molding, filling and the like uses.

The use of degraded alkali-soluble cellulose in the present invention in admixture with alkaline solutions of alkali-soluble cellulose ether is highly advantageous in particular for the printing and pad dyeing of textile fabrics where the stiffness resulting from the use of cellulose ether alone is not desired. The degraded cellulose modifies the stiffness and produces a softer hand and feel in the treated material.

For an extremely soft finish the ratio of degraded cellulose to cellulose ether should be about 3 to 1. For a firmer hand a ratio of degraded cellulose to cellulose ether of 1 to 3 may be used but it is obvious that the proportions can be varied as desired.

By way of explanation of the invention and not in limitation thereof, the following applications of the alkali-soluble cellulose composition of the present invention will be explained:

Example IV

Two parts of the alkali-soluble cellulose produced as previously described are dissolved in 98 parts of a 4 per cent aqueous solution of sodium hydroxide. This is done by mixing the cellulose and the sodium hydroxide solution and cooling the two to approximately −10° C. Thereafter, the solution is brought back to room temperature while stirring and the cellulose remains in solution.

The alkaline solution of cellulose is then applied to the desired textile material in any desired manner, for example, by means of a well-known type of textile padder or back-filling machine. The textile material so treated is then subjected to a wash with a 5 per cent aqueous solution of sulphuric acid to coagulate the cellulosic material in situ within the fabric. The fabric containing the coagulated cellulosic composition is then washed with plain water and dried either by an air drier or on heated cans in known manner. The fabric so treated retains a substantial portion of the cellulosic compositions in situ after repeated launderings using hot water and soap in accordance with normal laundering operations.

*Example V*

The alkaline cellulosic solution is prepared as set forth in the immediately preceding example and is padded onto the material. The material so padded is then subjected to an elevated temperature for sufficient time to decrease the viscosity of the material to a point where it can more effectively penetrate the fabric. The fabric is then treated with a 5 per cent aqueous sulphuric acid solution to coagulate the material in situ and is then washed and dried as in the preceding example. This fabric so treated likewise withstood repeated laundering operations and retained the appearance and feel produced by the treatment with the alkali-soluble cellulosic material.

*Example VI*

Four parts of regenerated cellulose, rendered alkali-soluble as explained above, are mixed with 96 parts of a 4 per cent aqueous solution of sodium hydroxide and the mixture is chilled to —10° C. and then rewarmed to room temperature with mechanical agitation. The alkaline solution of cellulose so formed is then heated gradually at a slightly elevated temperature, for example, 30 to 50° C. to partially dehydrate the solution until it is in the form of a thin gel. As an alternative, the alkaline solution of cellulose may be gelled by the addition of a salt or a weak acid which may be washed from the fabric after application of the gel thereto or even by the addition of water. Textile fabric to be treated is then padded with the thin gel on any well-known type of padding machine. Following this, the padded textile is subjected to an elevated temperature to lower the viscosity of the gel and induce added penetration of the cellulose. Following this, the cellulose is coagulated by washing with a 5 per cent aqueous solution of sulphuric acid. The fabric is then washed and dried in well-known manner. The fabric so produced has an unusually soft hand, is greatly increased in weight, and will withstand repeated laundering operations without a material loss of the cellulosic material.

*Example VII*

A solution is prepared comprising water 94 parts, sodium hydroxide 6 parts, alkali-soluble cellulose ether 2 parts, and degraded alkali-soluble cellulose produced as described above 2 parts. If desired, the solution of the cellulosic materials in the alkaline solution may be hastened by chilling, for example, to —10° C. and thereafter rewarming to room temperature preferably with mechanical agitation. Textile fabric is treated with this alkaline cellulose ether-degraded cellulose solution in any desired manner as by padding, back-filling or the like. Thereafter, the cellulosic material is coagulated by treating the fabric bearing the cellulosic material with a dilute acid solution, for example, a 5 per cent aqueous solution of sulphuric acid. The treated fabric is then washed and dried in any well-known desired manner.

The fabric produced in this manner is unusually soft to the feel and, at the same time, the finish is extremely laundry-fast. The tendency toward harshness frequently observed in the use of solutions of alkali-soluble cellulose ether alone for treating textiles is entirely absent in the present fabric.

The alkali-soluble cellulose ether employed may be any desired alkali-soluble cellulose ether, for example, such as those disclosed in United States Patents 1,682,292; 1,683,682; 1,722,927; and 1,722,928.

*Example VIII*

Same as Example VII except that 3 parts of an alkali-stable pigment are added to the solution. The alkali-stable pigment may be, for example, iron oxide, burnt sienna, umber, lamp black, or titanium dioxide. The pigmented solution is diluted with an alkaline solution or some of the unpigmented solution as desired to make a printing paste of required viscosity. Textile fabric is printed with this paste and subjected to vapors of acetic acid at an elevated temperature until the printed deposit is coagulated after which the printed fabric is finished in a known manner.

*Example IX*

Solution formed as disclosed in Example VI has mixed therewith 3 parts of a pigment such, for example, as any one of those disclosed in Example VIII and the finished solution is used to print or otherwise color and/or decorate textile fabrics in the same manner as that disclosed in Example VIII.

*Example X*

A solution prepared as disclosed in Example VII is used to impregnate cotton sewing thread. The thread so impregnated is thereafter passed through a dilute acidic solution, for example, a 5 per cent aqueous solution of sulphuric acid, to coagulate the cellulosic material in and on the thread. Thereafter, the thread is passed through one or more wash baths to wash out the acid and any residual caustic. The thread is dried as desired, for example, on suitable reels and is then stored on spools or placed on small spools for sales distribution as desired.

Sewing thread so treated is unusually strong and has a good hand and, at the same time, is sufficiently flexible to permit of use on high speed sewing machines. This is of outstanding advantage because sewing threads treated in accordance with prior art processes have been too inflexible to permit of their being used in high speed sewing operations.

The degraded regenerated cellulose of the present invention can be used in the place of starch for sizing textile fabrics, paper and the like and is much more laundry-resistant than starch. The regenerated degraded cellulose of the present invention may also be mixed with clays, bentonite and the like fillers to produce a paper size which can be employed to produce paper having excellent writing qualities as well as being resistant to handling, creasing and the like.

The degraded regenerated cellulose of the present invention can also be used when in the form of an alkaline solution to cast or otherwise form films, filaments and the like by the use of well-known processes and in addition can be u s a base for printing inks intended for over-all coverage or for usual character printing.

The process of the present invention makes it possible to accurately control the degradation of regenerated cellulosic material to a point where it is soluble in amounts varying between 1 and 20 per cent in aqueous solutions of alkalis varying in concentration between 2 and 15 per cent. The exact amount of degradation required to produce this selective solubility can be carried out and then stopped so that excessive degradation is not brought about. The quality of the finished product is thereby enhanced which makes it possible to produce superior articles from the composition of the invention.

Since certain changes in carrying out the above process and certain modifications in the product which embody the invention may be made without departing from its scope, it is intended that all matter contained in the above description shall be interpreted as illustrative and not in a limiting sense.

The invention having been described, what is claimed is:

1. A composition of matter comprising regenerated cellulose which has been oxidized to the point of being soluble in aqueous alkaline solutions.

2. A composition of matter comprising regenerated cellulose which has been oxidized with sodium hypochlorite to the point of being soluble in aqueous alkaline solutions.

3. A composition of matter comprising an aqueous solution containing a water-soluble alkali, a pigment carried by said solution, and regenerated cellulose which has been oxidized to the point of being soluble in aqueous alkaline solutions.

4. A composition of matter comprising an aqueous solution of a water-soluble alkali, cellulose ether, and regenerated cellulose which has been oxidized to the point of being soluble in aqueous alkaline solutions.

5. A composition of matter comprising an aqueous solution of sodium hydroxide, an alkali-soluble cellulose ether and regenerated cellulose which has been degraded by the use of sodium hypochlorite, said cellulose materials being dissolved in said sodium hydroxide solution and a pigment carried by said solution.

6. A composition of matter comprising an aqueous solution of sodium hydroxide and a cellulose ether and regenerated cellulose which has been degraded by the use of sodium hypochlorite dissolved in said sodium hydroxide solution.

RALPH T. K. CORNWELL.

---

CERTIFICATE OF CORRECTION.

Patent No. 2,365,455.　　　December 19, 1944.

RALPH T. K. CORNWELL.

It is hereby certified that error appears in the printed specification of the above numbered patent requiring correction as follows: Page 2, first column, line 35, strike out the word "regenerated" and insert the same before "cellulose" in line 47; same page and column, line 35-36 and line 47-48, strike out "hydrate"; and that the said Letters Patent should be read with this correction therein that the same may conform to the record of the case in the Patent Office.

Signed and sealed this 24th day of April, A. D. 1945.

Leslie Frazer

Acting Commissioner of Patents.

(Seal)

a base for printing inks intended for over-all coverage or for usual character printing.

The process of the present invention makes it possible to accurately control the degradation of regenerated cellulosic material to a point where it is soluble in amounts varying between 1 and 20 per cent in aqueous solutions of alkalis varying in concentration between 2 and 15 per cent. The exact amount of degradation required to produce this selective solubility can be carried out and then stopped so that excessive degradation is not brought about. The quality of the finished product is thereby enhanced which makes it possible to produce superior articles from the composition of the invention.

Since certain changes in carrying out the above process and certain modifications in the product which embody the invention may be made without departing from its scope, it is intended that all matter contained in the above description shall be interpreted as illustrative and not in a limiting sense.

The invention having been described, what is claimed is:

1. A composition of matter comprising regenerated cellulose which has been oxidized to the point of being soluble in aqueous alkaline solutions.

2. A composition of matter comprising regenerated cellulose which has been oxidized with sodium hypochlorite to the point of being soluble in aqueous alkaline solutions.

3. A composition of matter comprising an aqueous solution containing a water-soluble alkali, a pigment carried by said solution, and regenerated cellulose which has been oxidized to the point of being soluble in aqueous alkaline solutions.

4. A composition of matter comprising an aqueous solution of a water-soluble alkali, cellulose ether, and regenerated cellulose which has been oxidized to the point of being soluble in aqueous alkaline solutions.

5. A composition of matter comprising an aqueous solution of sodium hydroxide, an alkali-soluble cellulose ether and regenerated cellulose which has been degraded by the use of sodium hypochlorite, said cellulose materials being dissolved in said sodium hydroxide solution and a pigment carried by said solution.

6. A composition of matter comprising an aqueous solution of sodium hydroxide and a cellulose ether and regenerated cellulose which has been degraded by the use of sodium hypochlorite dissolved in said sodium hydroxide solution.

RALPH T. K. CORNWELL.

CERTIFICATE OF CORRECTION.

Patent No. 2,365,455.    December 19, 1944.

RALPH T. K. CORNWELL.

It is hereby certified that error appears in the printed specification of the above numbered patent requiring correction as follows: Page 2, first column, line 35, strike out the word "regenerated" and insert the same before "cellulose" in line 47; same page and column, line 35-36 and line 47-48, strike out "hydrate"; and that the said Letters Patent should be read with this correction therein that the same may conform to the record of the case in the Patent Office.

Signed and sealed this 24th day of April, A. D. 1945.

Leslie Frazer

Acting Commissioner of Patents.

(Seal)